United States Patent
Jennison

[11] Patent Number: 5,651,696
[45] Date of Patent: Jul. 29, 1997

[54] CEBUS TAP POINT UNIT

[76] Inventor: Michael T. Jennison, 2176 Morning Wind Cir., Bridgeville, Pa. 15017-1616

[21] Appl. No.: 430,240

[22] Filed: Apr. 28, 1995

[51] Int. Cl.$^6$ .................................. H01R 13/74
[52] U.S. Cl. .............................. 439/536; 174/66
[58] Field of Search ............... 174/66, 67; 439/535–539, 439/540.1

[56] References Cited

U.S. PATENT DOCUMENTS

| | | | |
|---|---|---|---|
| 4,443,654 | 4/1984 | Flachbarth et al. | 174/67 |
| 5,002,502 | 3/1991 | Hill | 439/540.1 |
| 5,125,852 | 6/1992 | Archer | 439/536 |
| 5,356,311 | 10/1994 | Liu | 439/536 |
| 5,457,286 | 10/1995 | Flasz | 174/66 |

*Primary Examiner*—Gary F. Paumen
*Attorney, Agent, or Firm*—Titus & McConomy

[57] ABSTRACT

A tap point unit which comprises a base plate having spaced apart left and right receptacle opening and a pair of vertically aligned circular openings for a coaxial connector mounting and a rectangular opening vertically aligned with the circular opening to mount a modular jack. The unit also includes a housing mounted to the base plate between the receptacle openings and having a pair of circular opening coaxially aligned with the pair in the base plate and a rectangular opening coaxially aligned with the rectangular opening. The tap point unit of the invention is CEBUS compliant.

4 Claims, 2 Drawing Sheets ns,651,696

CEBUS TAP POINT UNIT

FIELD OF THE INVENTION

The invention relates to an electrical outlet and, in particular, to a tap point unit which is compliant with the EIA-600 CEBUS standard.

BACKGROUND OF THE INVENTION

Electrical outlet boxes and support facia are well known. These outlets are used to connect electrical appliances to the house or building circuits or used to control various components within an electrical circuit such as electric lights.

Because of the need to handle more than electrical appliances, the Electronic Industry Association adopted a BUS standard (EIA-600 CEBUS) for new residential construction. The standard incorporates various communication protocols to accommodate coaxial and twisted pair cabling, powerline and radio frequency medias. The standard addresses a very wide array of communication media.

To utilize the BUS standard, new components are necessary. Accordingly, it is an object of the present invention to provide a BUS tap point unit which is fully compliant with the EIA standard. Another object of the invention is to provide a tap unit for the CEBUS which is simple to make and relatively easy to install and use in the field.

SUMMARY OF THE INVENTION

Generally, the present invention provides a tap point unit which comprises a base plate having a pair of spaced apart receptacle openings each of a size and shape to accept for mounting a standard electrical receptacle such as a switch or electrical outlet. Preferably, the base plate is made from an insulating material such as ABS plastic.

Located between the receptacle openings is a housing mounted to the front surface of the base plate. Mounting is most desirably accomplished by means of snap tabs which insert and snap fit into slots on the base plate to facilitate manufacture. The housing is of a depth sufficient to protect the outward extension of coaxial connectors and a modular jack.

A pair of circular openings are provided in the housing and a second pair are located coaxially therewith on the base plate. The openings are of a diameter sized to accept a pair of female coaxial connectors mounted to the base plate. A third pair of aligned openings, rectangular in configuration, provided are in each of the housing and base plate juxtaposed with the circular openings. This pair of openings is sized to accept a modular jack such as an RJ45 jack used for level 5 communication ability.

The housing provides protection to connectors made to the coaxial connection and preferably provides keyway slots in the periphery of the openings to fit keys provided on a male connector fitting. The EIA compliant tap box provides keyway slots that are aligned for internal and external wiring connection. Also, in a preferred embodiment, a pair of sockets are integrally molded to the back surface of the base plate in coaxial alignment with the openings for two coaxial connections. These sockets provide protection to the connectors and connections by affording a very tight fit for push on or threaded male connectors.

Other advantages of the invention will be apparent from a perusal of the following detailed description of a presently preferred embodiment taken in connection with the accompanying drawings.

PRESENTLY PREFERRED EMBODIMENT

Figure 1:
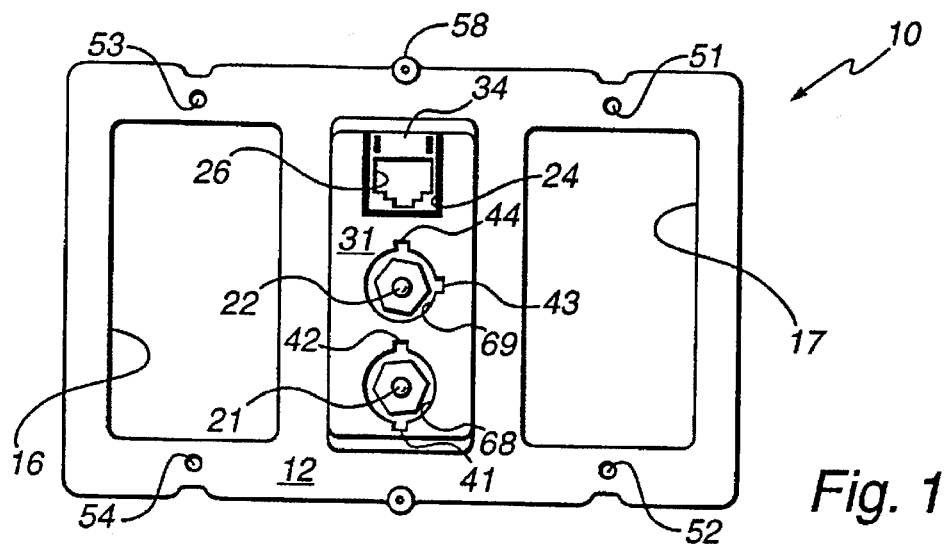
FIG. 1 is a front elevation of the tap point unit of the present invention.
Figure 2:
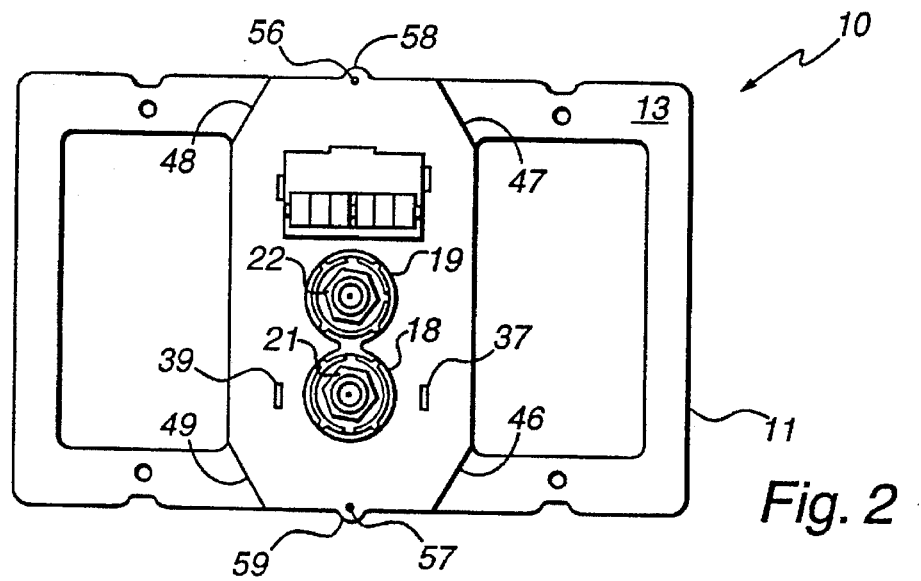
FIG. 2 is a rear elevation of the invention.
Figure 3:
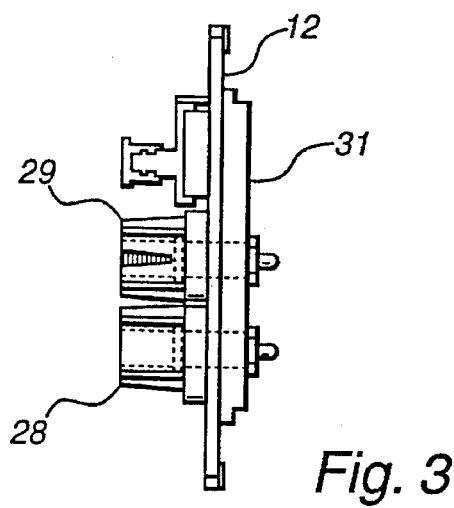
FIG. 3 is a side elevation of the invention.
Figure 4:
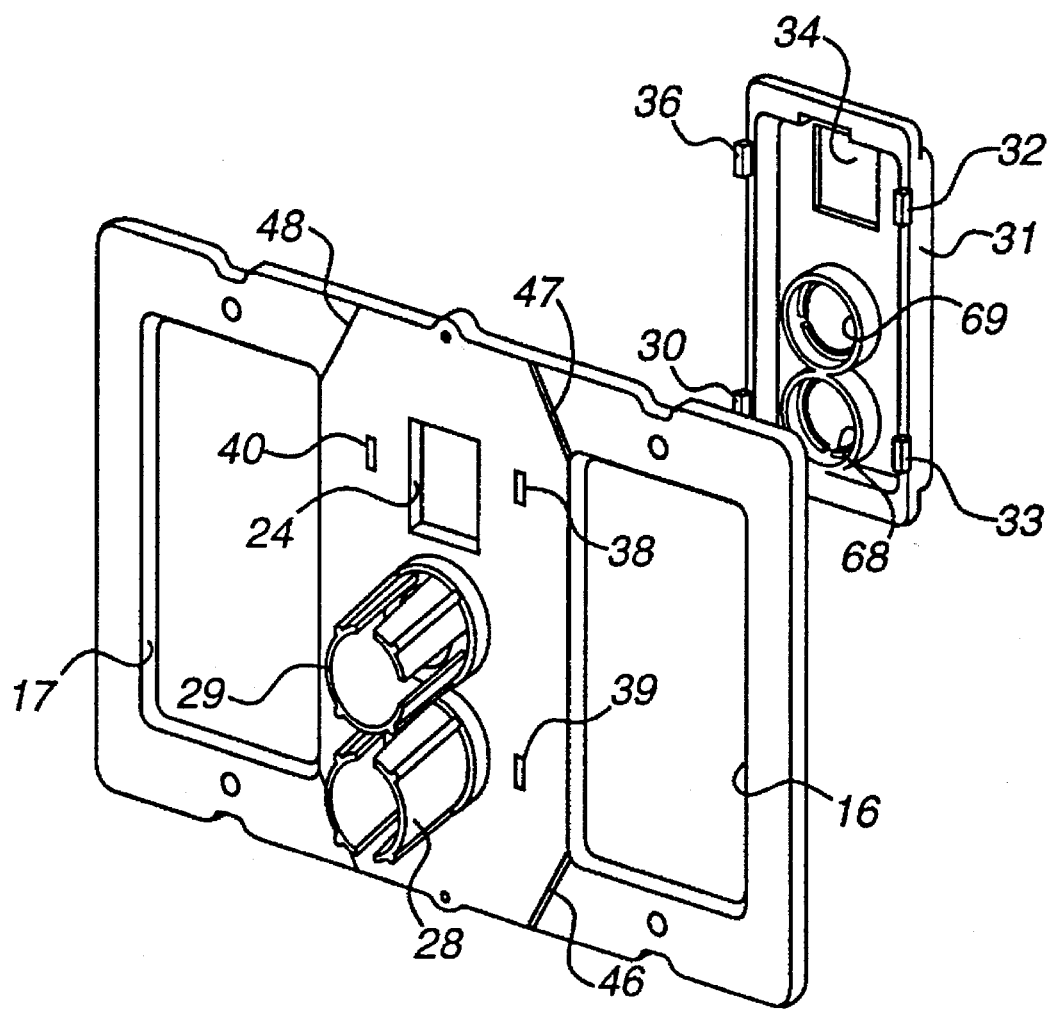
FIG. 4 is an isometric view of the invention in partial exploded view without connectors or jack.

Referring to the drawing, the CEBUS tap point unit 10 comprises a base plate 11 having a front surface 12 and a back surface 13. Base plate 11 includes left and right receptacle openings 16 and 17, respectively. Receptacle openings 16 and 17 are of a size and shape to accommodate a standard electrical box and faceplates.

Base plate 11 includes a pair of circular openings 18 and 19 which are sized to fit coaxial cable connectors, in particular female "F" type connectors, 21 and 22. Connector 21 is preferably labeled for external connection and 22 is labeled for internal wiring connection in accordance with CEBUS convention. A rectangular opening 24 is provided to accept a modular jack 26 such as an RJ45 type jack.

On the back surface 13 of base plate 11 are a pair of integrally mounted sockets 28 and 29 which are coaxially aligned with openings 18 and 19, respectively. In the preferred embodiment of the invention, base plate 11 and sockets 28 and 29 are preferably molded from an insulating plastic such as ABS plastic.

Mounted to front surface 12 is housing 31 which includes four integrally molded snap-tabs 30, 32, 33, and 36, which are adapted to snap into corresponding slots 37, 38, 39 and 40, respectively. Housing 31 includes opening 34 which is co-extensive with opening 24 to accept jack 26. The depth of housing 31 is preferably sized to accommodate the outward extent of the standard jack and "F" type coaxial connectors. In such case, the face plane of jack 26 is substantially coincidental with the face of housing 31. Housing 31 includes openings 68 and 69 which are aligned with opening 18 and 19, respectively, in baseplate 11. Openings 68 and 69 are keyed to provide keyways 41 and 42, 43 and 44, respectively, to accept push-on or threaded male connectors.

Back surface 13 includes scorelines 46–49 for breaking off one of the receptacle openings 16 or 17 depending upon whether it is a right or left electrical box which is to be accommodated. Because the coaxial connections and jack are aligned in a specific configuration, it is not possible to turn the base plate upside down to achieve the proper left or right access.

Base plate 11 includes two pairs of openings 51 and 52, 53 and 54, each pair associated with a receptacle opening 16 or 17. Openings 51–54 accept standard electrical fitting mounting screws. Openings 56 and 57 are provided on associated tabs 58 and 59, for mounting unit 10 to an electrical box.

While a present preferred embodiment of the invention has been shown and described in particularity, the invention may be otherwise embodied within the scope of the appended claims.

What is claimed:

1. A tap point unit comprising
   a. a base plate having spaced apart left and right receptacle openings; a first pair of circular openings in vertical alignment between said receptacle openings and a first rectangular opening above and in vertical alignment with said circular openings.

b. a housing removably mounted on said base plate between said receptacle openings; said housing having a pair of circular openings coaxially aligned with said first pair of circular openings, and a rectangular opening aligned with said first rectangular opening in said base plate.

c. a pair of circular sockets mounted to said base plate juxtaposed and coaxially aligned with said first pair of circular openings for receiving a pair of coaxial connectors.

2. A tap point unit as set forth in claim 1 including coaxial connectors mounted in each of said sockets and extending through said first pair of circular openings into said housing.

3. A tap point unit as set forth in claim 1 including a modular jack mounted in said first rectangular opening and projecting into said housing.

4. A tap point unit as set forth in claim 1, 2 or 3 including break points on said base plate adjoining said left and right receptacle openings.

* * * * *